(No Model.) 2 Sheets—Sheet 1.

J. A. COWLES.
HYDROCARBON BURNER.

No. 312,976. Patented Feb. 24, 1885.

Witnesses.
Henry Frankfurter
Frank Melen

Inventor.
J. A. Cowles (No Model.) 2 Sheets—Sheet 2.

J. A. COWLES.
HYDROCARBON BURNER.

No. 312,976. Patented Feb. 24, 1885.

Witnesses.
Henry Frankfurter.
Frank Melen.

Inventor
J. A. Cowles

UNITED STATES PATENT OFFICE.

JAMES A. COWLES, OF CHICAGO, ILLINOIS.

HYDROCARBON-BURNER.

SPECIFICATION forming part of Letters Patent No. 312,976, dated February 24, 1885.

Application filed June 5, 1884. (No model.)

*To all whom it may concern:*

Be it known that I, JAMES A. COWLES, a citizen of the United States, residing in the city of Chicago, in the State of Illinois, have invented a new and useful Improvement in Hydrocarbon-Burners, of which the following is the specification.

The nature and object of this invention is to provide a cheap, practical, and efficient hydrocarbon-burner.

Figure 1:
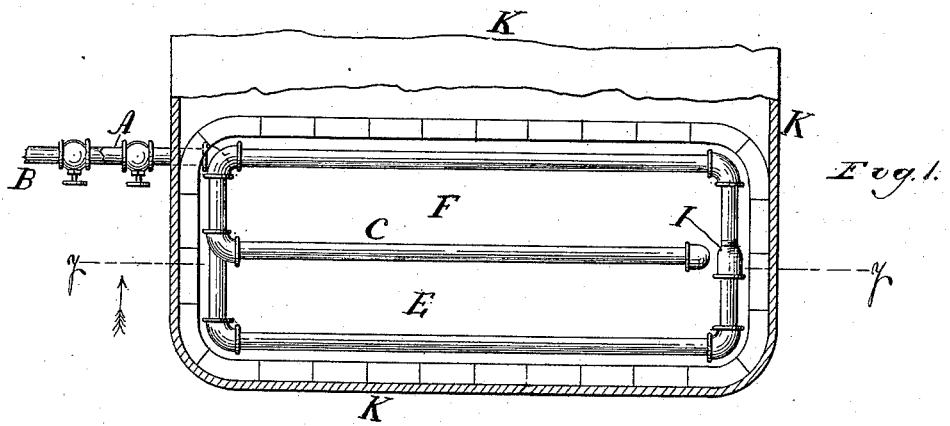
Figure 2:
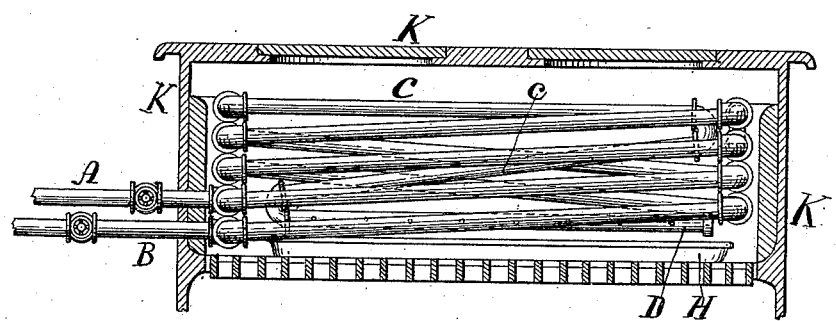
Figures 3, 4, 5:
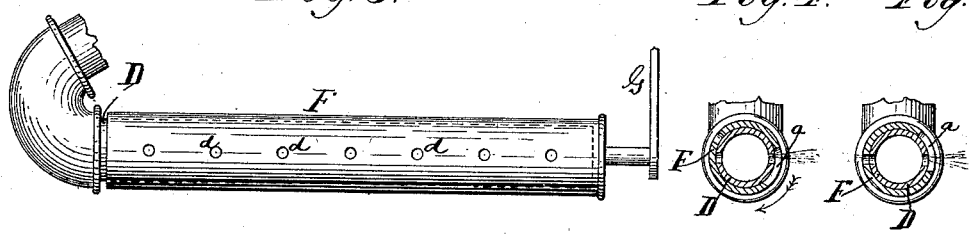
Figure 6:
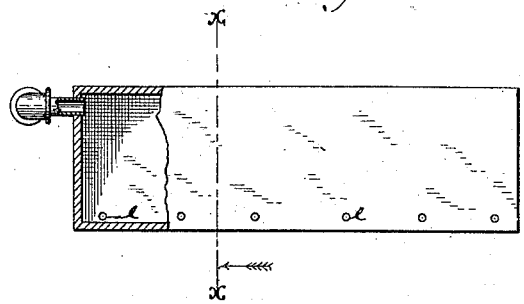
Figure 7:
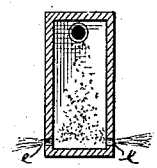
Figure 8:
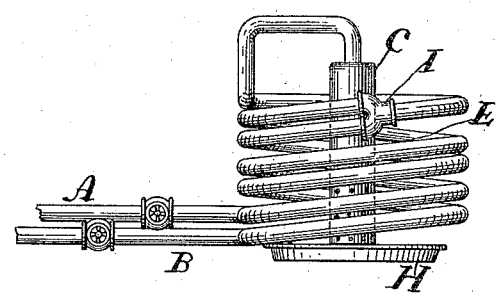
Figure 10:
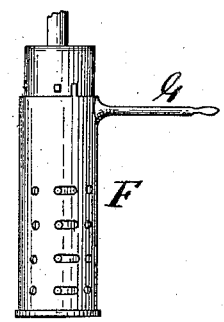
Figure 9:
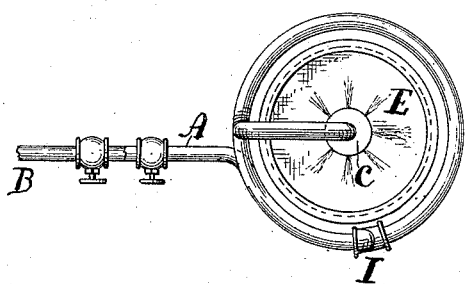

Figure 1 is a plan view. Fig. 2 is a sectional elevation. Fig. 3 is a detail of burner part, showing sleeve-valve. Figs. 4 and 5 are cross-sections of Fig. 3. Fig. 6 is a detail of modification in the construction of gas-chamber and burner part; Fig. 7, a cross-section through line $x\ x$ of Fig. 6. Fig. 8 is an elevation of modification in gas-chamber and burner part. Fig. 9 is a plan view of Fig. 8. Fig. 10 is a detail of gas-chamber and burner part shown in Fig. 8, provided with sleeve-valve.

Similar letters of reference refer to similar parts in the different figures.

A and B, Fig. 2, are two pipes, each leading from a reservoir, parallel with each other, and in this relative position they make one or more turns, forming a helical coil, when they are united in one single pipe. Thence this single pipe passes into the gas-chamber C, located within the coil. In Figs. 1 and 2 this gas-chamber is made of pipe, and extends backward and forward and downward within the coil, and terminates in the burner or perforated part D. (See Fig. 2.) These perforations consist of two rows in regular order and immediately opposite each other. On either side of this gas-chamber C, and within the coil, is the combustion-chamber E, extending through the entire depth of the coil. On this perforated part of the burner I place a sleeve-valve, F. In this sleeve-valve are perforations $d\ d\ d$, which register with perforations in burner part. In this sleeve-valve, and opposite to the perforations $d\ d\ d$, is an elongated slot, Figs. 4 and 5, which at all times is in front of one row of perforations in burner part.

G, Fig. 3, is a rod or handle for working this sleeve-valve. By turning this sleeve to a certain point both rows of perforations in burner part are open, as shown in Fig. 5. By turning it to a certain other point one row of perforations is closed, as shown in Fig. 4. The elongated slot $a$ is made sufficiently wide at all times to allow the row of holes facing it to be open.

H is a lighting-pan located below the coil and gas-chamber.

In Fig. 6 is a modified form of gas-chamber, where it is made in rectangular form, and extends from the top through the entire depth of coil, with perforations along the opposite lower edges, as shown at $e\ e$, Figs. 6 and 7, a cross-section of which is shown in Fig. 7. When the coil is purely circular in form, the gas-chamber C passes through the center thereof, leaving an annular combustion-chamber surrounding it. (See Figs. 9 and 8.) The uniting of the two parallel pipes A and B into one is shown in Fig. 8 at I. A top view of same is shown at I, Figs. 1 and 9.

The operation is as follows: In the lighter-pan H is placed oil, and any kind of wicking, if desired, when it is set on fire, which heats the pipes forming the coil. Water through one and carbon-oil through the other of the pipes A and B pass from the respective reservoirs into the coil, where both are converted into gas, and these gases are united in the single pipe, whence they pass into the gas-chamber C, thence out through the perforations in the burner part, at which point they are ignited. The heat from the burning jets of gas striking against the coil of pipes keeps them to such a high degree of heat that both the water and oil are converted into gas.

K K, Figs. 1 and 2, represent the sides of a stove or furnace, within which is placed the burner, with the supply-pipes A and B passing through one side.

When it is desired to reduce the flame or heat, one set of perforations is cut off by turning the sleeve-valve F slightly, and leaving the other row or set open.

I claim—

1. In a hydrocarbon-burner, the combination, with water and oil reservoirs, of parallel pipes formed into a helical coil and merging into a single pipe or gas-chamber, which extends within the coil and terminates in a perforated burner, and a perforated sleeve-valve for controlling the burner, substantially as described.

2. In a hydrocarbon-burner, the combination of parallel pipes merging into a single pipe whose extremity is provided with perforations, and a sleeve-valve provided with a slot and perforations which register with those of the pipe, said parallel pipes being so turned as to form a combustion-chamber, into which the perforated end or burner of the single pipe is located, substantially as described.

3. In a hydrocarbon-burner, the combination of a centrally-located perforated burner and an annular combustion-chamber with water and oil inlet pipes connecting with the burner, and a perforated sleeve-valve surrounding the same and having a handle, all substantially as and for the purposes described.

4. In a hydrocarbon-burner, the combination of two parallel pipes describing a helical coil, and forming thereby an inner combustion-chamber, said pipes merging into a single pipe or gas-chamber, which extends within the combustion-chamber and terminates in a perforated burner, substantially as described, and for the purposes set forth.

JAMES A. COWLES.

Witnesses:
FELIX J. GRIFFEN,
WM. S. GOLDEN.